(12) United States Patent
Lazic et al.

(10) Patent No.: US 9,671,310 B2
(45) Date of Patent: Jun. 6, 2017

(54) METHOD AND APPARATUS FOR INSPECTING CLUSTER GEARS

(71) Applicant: Automation Controls & Engineering, LLC, Dexter, MI (US)

(72) Inventors: Predrag Lazic, Dexter, MI (US); Chris Mackey, Dexter, MI (US); Steve Moore, Dexter, MI (US)

(73) Assignee: Automation Controls & Engineering, LLC, Dexter, MI (US)

( * ) Notice: Subject to any disclaimer, the term of this patent is extended or adjusted under 35 U.S.C. 154(b) by 232 days.

(21) Appl. No.: 14/717,067

(22) Filed: May 20, 2015

(65) Prior Publication Data
US 2015/0338309 A1    Nov. 26, 2015

Related U.S. Application Data

(60) Provisional application No. 62/000,574, filed on May 20, 2014.

(51) Int. Cl.
*G01M 13/02* (2006.01)

(52) U.S. Cl.
CPC .................. *G01M 13/021* (2013.01)

(58) Field of Classification Search
USPC ................. 73/162; 33/501.7, 501.8
See application file for complete search history.

(56) References Cited

U.S. PATENT DOCUMENTS 4,488,359 A    12/1984    Misson

*Primary Examiner* — Michael A Lyons
*Assistant Examiner* — Jean Morello
(74) *Attorney, Agent, or Firm* — Dinsmore & Shohl LLP

(57) ABSTRACT

A method and apparatus for measuring cluster gears for run-out employs a plurality of master gears, each engageable with one of the gears of the cluster and each supported on a fluid cylinder powered slide movable radially to a gear to be measured. As the gear to be measured is rotated, the radial motion of the slides is sensed and compared to maximum values by a computer. An additional master gear, having sections engageable with each gear of a cluster simultaneously on its own slide, may be provided to measure the total run-out of the cluster.

11 Claims, 3 Drawing Sheets

METHOD AND APPARATUS FOR INSPECTING CLUSTER GEARS

CROSS-REFERENCE TO RELATED APPLICATIONS

This application claims priority of U.S. Provisional Application No. 62/000,574 filed May 20, 2014, the contents of which are incorporated herein by reference.

FIELD OF THE INVENTION

This invention relates to a machine and apparatus for checking cluster gears to detect the run-out of the cluster gears relative to master gears and to accept or reject gears for use based on these measurements.

BACKGROUND OF THE INVENTION

Run-out of a gear is technically the maximum variation of the distance between a surface of revolution and a datum surface, measured perpendicularly to that datum surface. Run-out of a gear relative to a master gear can be measured by bringing the two into meshed engagement, rotating them, and measuring the variation between the center lines of the reference gear and the measured gear during that rotation. Run-out can result in accumulated pitch variation in the rotation of a pair of meshing gears resulting in a non-uniform transfer of motion.

In the past, in shop practice the run-out of a gear has been measured with a dial indicator over pins or balls.

Automatic machines have been proposed for automatically gauging a gear to be measured for run-out with a master gear while both are in close meshed engagement during a full 360 degree rotation. U.S. Pat. No. 4,488,359 to Misson discloses a system in which a gear to be measured is rotatably supported and moved into tight meshed engagement with a master gear and for rotating the gear to be measured and sensing the variation in center-to-center distance between the gears during this rotation.

In many mechanical systems such as transmissions, cluster gears are utilized which constitute two or more gears of different sizes mounted on the same shaft and often formed on the same gear blank, and it is difficult to measure the run-out of each of the gears of the cluster and of the cluster itself using conventional prior art practices and machinery.

SUMMARY OF THE INVENTION

The present invention provides a machine for automatically measuring the run-out of each of the gears forming a cluster gear, individually, as well as the total run-out of the combined gears. For each of the gears on the cluster, the device of the present invention provides a separate spindle for rotatably supporting master gears to use in performing the run-out check, with each spindle being supported on a slide extending along a radius to the spindle supporting the gear to be checked. Each of the spindles may be moved along their slides by a fluid cylinder including a piston. Each slide, in sequence, is driven toward the gear to be inspected, so that the master gear supported on that slide is brought into meshed engagement with one of the gears of the cluster. The gear to be inspected is then rotated through 360 degrees. Any run-out of the gear being inspected relative to its master will result in radial forces on the spindle supporting that master gear.

The fluid pressure driving the piston of the cylinder for that slide is adjusted so that the master gear is moved radially toward and away from the gear being tested as a result of run-out. These motions are detected by sensors which send signals to a master computer for recording the run-out for each gear, compares that run-out to a maximum reference run-out value, and thereby detects defective gears.

In one embodiment of the invention in addition to providing a master gear, spindle, and radial slide for each of the gears of the cluster, the combined run-out of all the gears in the cluster is measured by a master gear cluster which meshes simultaneously with all of the gears of the cluster being measured. This combined master is supported on an additional spindle and slide.

The run-out values sensed are compared to reference values and the gears with excessive run-out are rejected. The gears that pass this run-out test are marked with a serial number generated by the computer, preferably using a laser marking device, and the serial number and the run-out values measured for that gear are stored in the computer for later reference.

The run-out of the gear being tested, relative to the master gear carried on one of the slides, is measured by a linear sensor, preferably an LVDT (linear variable differential transformer). An LVDT for each of the slides is positioned on a base plate for the testing apparatus in a radial position so that as each slide moves forward to bring its master gear into contact with a gear to be measured, a probe of the LVDT is contacted by the slide and measures the slide position. During the rotation of a gear to be tested, as the run-out of the gear forces radial movement of a slide, the LVDT develops a position signal which is sent to the central computer.

BRIEF DESCRIPTION OF THE DRAWINGS

Other applications and advantages of the present system will be made clear by the following detailed description of a preferred embodiment of the invention. The description makes reference to the accompanying drawings in which.

DETAILED DESCRIPTION OF A PREFERRED EMBODIMENT OF THE INVENTION

Figure 1:
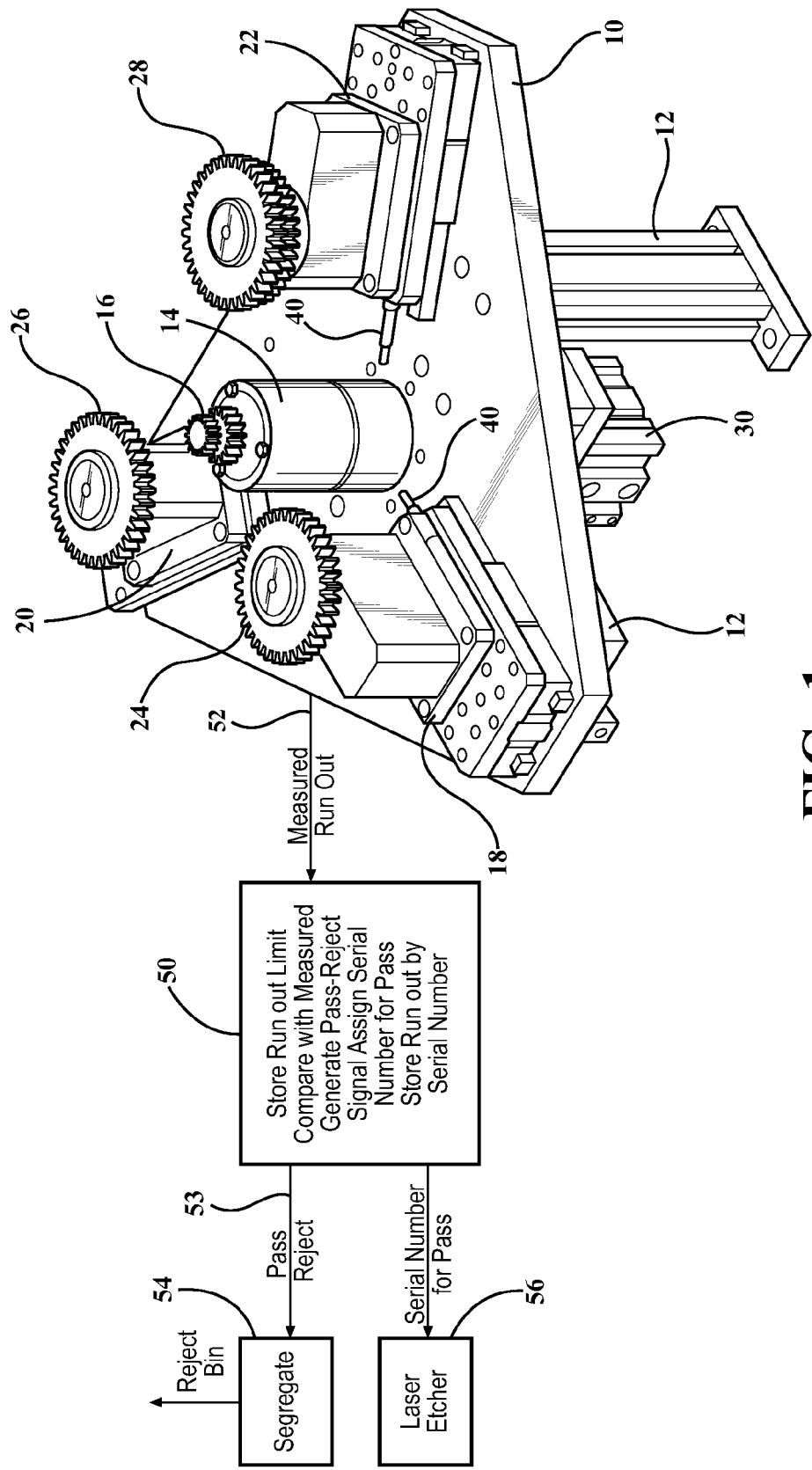
FIG. 1 is an isometric view of a run-out testing assembly for a cluster gear with two gears, providing spindles and slides for three master checking gears, two for checking the run-out of the individual gears in the cluster and a third for checking the run-out of both of them simultaneously, and illustrating in block diagram a computer for receiving the measured run-out signals and an associated gear segregator and laser etcher.
Figure 2:
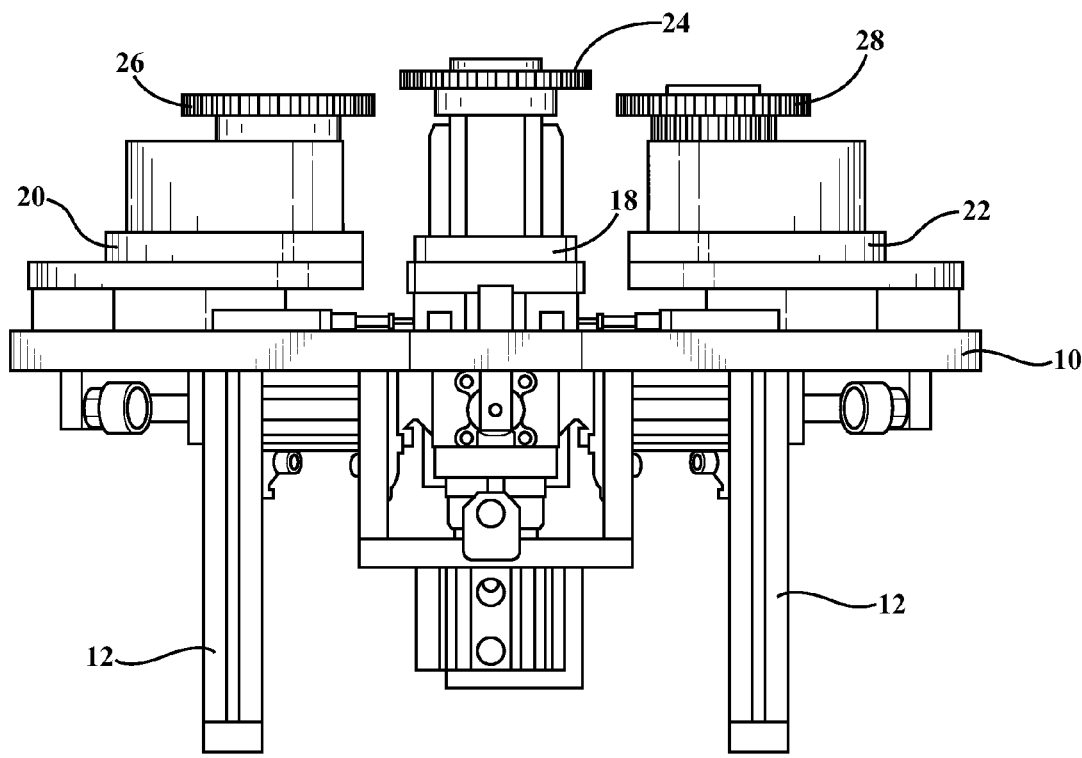
FIG. 2 is a front elevation view of the checking machine of FIG. 1.
Figure 3:
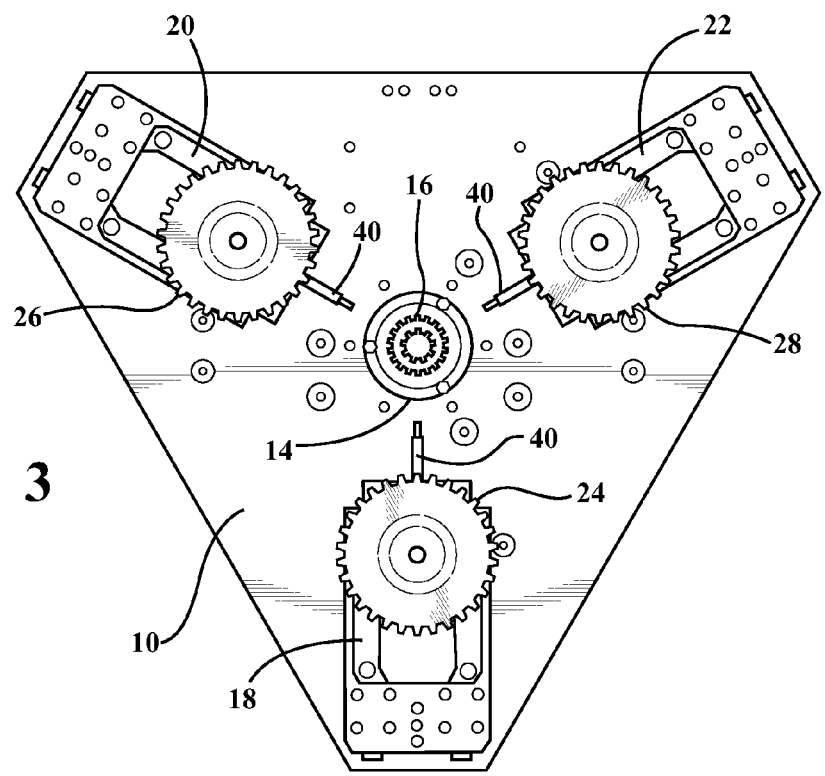
FIG. 3 is a top view of the checking machine of FIG. 1.

Referring to the drawings, the preferred embodiment of the invention is for use in inspecting a cluster of two gears. Clusters of a larger number of gears could be inspected by forms of the invention incorporating additional master gears each supported on its own spindle and slide.

The present version is built around a base plate 10 which is supported and elevated above a suitable subassembly (not shown) by a pair of support legs 12. A spindle 14 for supporting a cluster gear 16 to be checked for run-out is supported on the center of the top side of the base plate 10.

The spindle 14 is adaptable to various gears to be inspected. Since the preferred embodiment is for a cluster gear composed of two gears, the base supports three master gear slides 18, 20, and 22. The slides 18 and 20 support master gears 24 and 26 which mate singly with the two gears of the cluster gear to be tested 16. The third slide 22 supports a dual master gear 28 which engages both of the two gears of the cluster 16 simultaneously to measure the run-out of both simultaneously.

In other embodiments of the invention there may be no need to measure the run-outs of all the gears of a cluster simultaneously and accordingly there would only be a number of slides equal to the gears of the cluster. If the cluster had three gears instead of two, there would be a total of three master gears to check each of the three gears of the cluster and, if desired, a fourth slide to carry a composite gear that measured the run-out of all the gears of the cluster simultaneously.

During the run-out inspection the gear to be inspected is rotated through 360 degrees through an electric motor with a gear speed reducer 30 supported on a motor housing adapter 32 beneath the base plate 10.

Figure 4:
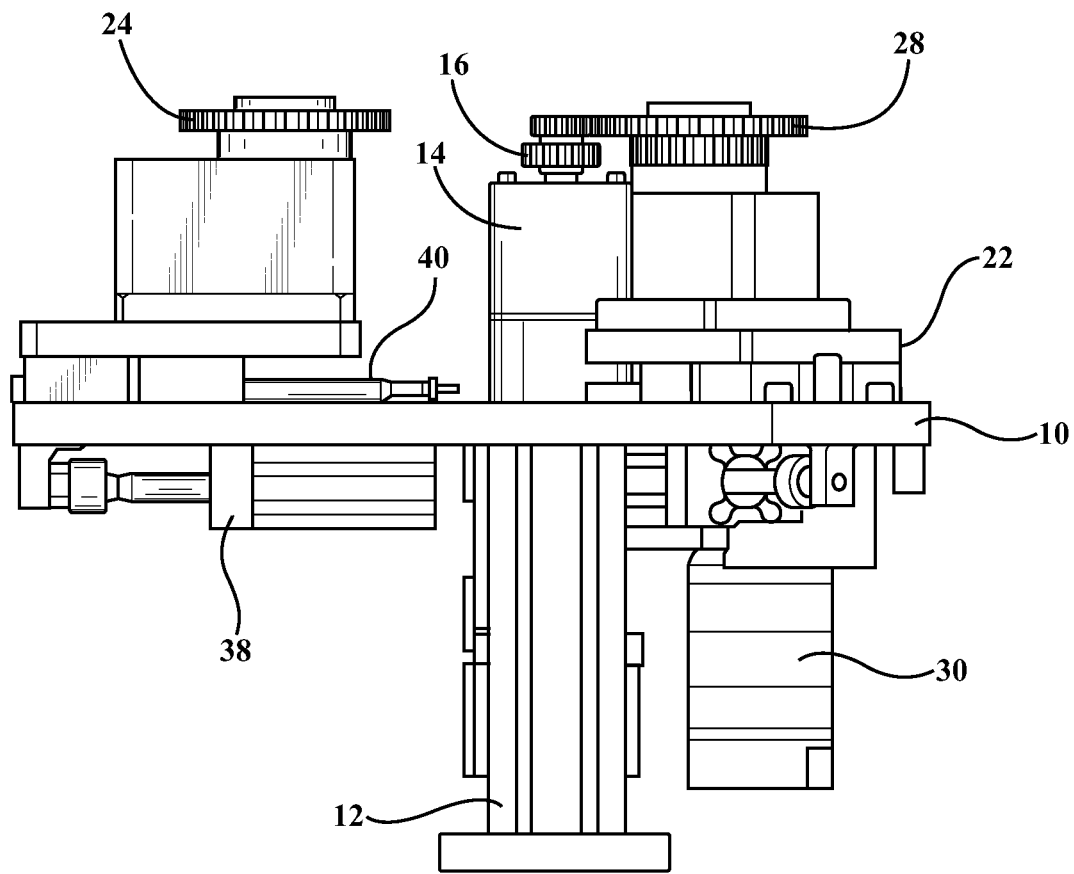
FIG. 4 is a side view of the checking machine of FIG. 1.

A proximity switch 34 supported beneath the base plate detects when the motor has rotated the gear to be inspected through a full revolution and deenergizes the motor. A standard pneumatic cylinder 36 supported beneath the base plate 10 acts to clamp a gear to be inspected onto the spindle 14. The spindles for the master gears are each driven into and out of contact with the gear to be tested by pneumatic cylinders 38, one of which is illustrated in FIG. 4 as being located beneath the base plate 10.

The position of each of the slides is sensed by an LVDT 40 fixed on the base plate in a direction radial to the spindle 14 in the path of motion of its associated slide. The LVDT measures the motion of the slide relative to the spindle 14 while the cluster gear 16 to be measured is being rotated. These signals are sent to a computer 50 via a line 52.

The computer 50 stores the maximum run-out limit for each of the gears of the cluster 16. These values are compared with the measured run-out to generate a pass-reject signal. The pass-reject signal is sent to a mechanism 54 which divides the tested gears between a reject bin based on a control signal 52 and the cluster gears that pass the measurement test. The computer 50 assigns a serial number to each cluster gear that has passed inspection and feeds it to a laser etcher which marks the serial number on that gear. The computer also stores the run-out information for each passed cluster gear along with the serial number for later reference.

The sequence of operation for the inspection machine is as follows:
1. The operator installs the appropriate master gear on the dead spindles of all three gear slides for the selected production part.
2. The operator installs the appropriate production gear ID clamp gripping mechanism to the inspection gear spindle for the selected production part.
3. A material handling device places an inspection gear onto the driven inspection gear spindle and clears the fixture envelope.
4. The driven inspection gear spindle clamp will actuate by motion of the cylinder 36, clamping the part on the ID (internal diameter).
5. The three master gear slide tables are then actuated forward by their pneumatic cylinders 38 to engage the production gear with the master gear. The "Double Gear" master 28 will contact the inspection piece on both gear diameters. The two "Single Gear" masters 24 and 26 will contact the inspection piece on only one of the gear diameters. Once engaged, the "Double Gear" master is now meshed with both of the inspection piece diameters, one of the "Single Gear" masters is meshed with the inspection piece bottom diameter and the other "Single Gear" master is meshed with the inspection piece top diameter, all at the same time.
6. The inspection gear 16 now starts to rotate. During initial rotation, the measuring probes 40 on all three master gear slides are monitoring the linear position of the slide table to first ensure the inspection and master gears have all meshed. Once the mesh is realized, the inspection gear will now monitor the rotation to ensure 1.5 revolutions of the inspection gear minimum while the measuring probes are monitoring the master gear slide table position for gear run-out or gear alignment and timing issues.
7. Once the inspection cycle is complete, the master gear slide tables retract back to the load/unload position and the inspection gear spindle unclamps the ID part clamp of the inspection piece.
8. Now the cycle is complete and the material handling device is clear to remove the gear and load the next one, restarting the cycle again at step 3.

Having thus disclosed our invention, we claim:

1. The method of inspecting cluster gears comprising a plurality of gears of different sizes mounted as a unit on the same shaft, to detect the run-out of each gear of the plurality relative to one of a plurality of master gears, comprising:
   mounting the cluster gear to be inspected on a powered spindle rotatable about a first axis;
   mounting each of said plurality of master gears one on each of a plurality of rotatable spindles on slides supported radially relative to said first axis, each spindle being powered for motion along its slide by a separate fluid cylinder;
   powering each of said spindles with its associated fluid cylinder to bring the master gear supported on such spindle into pressured meshing engagement with one of the plurality of gears of the cluster gear to be inspected;
   when a master gear is in engagement with one of the plurality of gears of the unit to be inspected, powering rotation of the spindle supporting the cluster gear to be inspected through at least a 360 degree rotation; and
   detecting radial motion of each of the slides during such rotation, and using such motion as a measure of the run-out of the gear on the cluster gear in meshing engagement with a master gear.

2. The method of claim 1, wherein all of the spindles are powered to bring the master gears into meshing engagement with the cluster gear simultaneously.

3. The method of claim 1, wherein the radial motion of each slide while the master gear supported on the slide is brought into contact with the cluster gear and the cluster gear is rotated, is stored for comparison with reference values of permissible run-out levels to determine the acceptability of the cluster gear.

4. The method of claim 3, further comprising marking accepted cluster gears with serial numbers.

5. The method of claim 4, wherein the run-out measurement of an accepted cluster gear and the serial number are recorded for later reference.

6. The method of claim 4, wherein the marking of an accepted cluster gear with a serial number is performed with a laser.

7. The method of claim 1, wherein the radial motion of the slides during meshed engagement of their master gears with the cluster gear is measured by an LVDT.

8. Apparatus for inspecting a cluster gear comprising a plurality of gears of different sizes mounted as a unit on the same shaft to detect the run-out of each gear of the plurality relative to one of a plurality of master gears to determine whether the run-out of any of the gears exceeds a maximum value, comprising:
- a powered spindle rotatable about a first axis adapted to support the cluster gear for inspection;
- a plurality of slides, one for each gear of the plurality of gears in the cluster gear, the slides being aligned for motion radially with respect to the first axis and each slide being adapted to rotatably support one of said plurality of master gears;
- a driving fluid cylinder associated with each slide for moving said slide radially with respect to the first axis to bring a master gear supported on said slide into meshing engagement with one of the gears of the cluster gear to be inspected;
- a recorder for storing the radial motion of each slide unit during the meshed rotation; and
- a computer for comparing said radial motion with stored maximum run-out values to determine the acceptability of the gear.

9. The apparatus of claim 8, wherein said computer generates control signals for segregating gear units having gears that exceed the maximum run-out and gears which meet the maximum run-out, and a laser marker for marking the gears that do not exceed the maximum run-out with serial numbers and storing the serial numbers with the measured run-out in said computer.

10. The apparatus of claim 8 further comprising a slide in addition to said plurality of sides, aligned for motion radially with respect to said first axis and adapted to support a master gear having sections for mesh with all of the gears of the cluster gear simultaneously.

11. The apparatus of claim 8, wherein said computer stores values for maximum run-out during rotation of the gear to be inspected while in contact with all of the master gears to determine whether the gear to be inspected should be rejected or accepted.

* * * * *